(12) United States Patent  (10) Patent No.: US 11,820,185 B2
Iino et al.  (45) Date of Patent: Nov. 21, 2023

(54) SUSPENSION DEVICE

(71) Applicant: NHK SPRING CO., LTD., Kanagawa (JP)

(72) Inventors: Shinji Iino, Kanagawa (JP); Yusuke Tanaka, Kanagawa (JP); Yosuke Kawai, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 3 days.

(21) Appl. No.: 17/610,687

(22) PCT Filed: May 25, 2020

(86) PCT No.: PCT/JP2020/020630
§ 371 (c)(1),
(2) Date: Nov. 11, 2021

(87) PCT Pub. No.: WO2020/261835
PCT Pub. Date: Dec. 30, 2020

(65) Prior Publication Data
US 2022/0212512 A1 Jul. 7, 2022

(30) Foreign Application Priority Data
Jun. 25, 2019 (JP) .................................. 2019-117818

(51) Int. Cl.
B60G 11/08 (2006.01)
B60G 11/10 (2006.01)
F16F 1/368 (2006.01)

(52) U.S. Cl.
CPC .............. *B60G 11/08* (2013.01); *B60G 11/10* (2013.01); *B60G 2202/112* (2013.01);
(Continued)

(58) Field of Classification Search
CPC ... B60G 11/08; B60G 11/10; B60G 2202/112; B60G 2206/428; B60G 2206/7101; F16F 1/3683
See application file for complete search history.

(56) References Cited

U.S. PATENT DOCUMENTS 2,039,983 A * 5/1936 Schlirf ................... B60G 11/08
280/124.136
2,072,156 A * 3/1937 Cooke, V .............. B60G 11/08
267/45
(Continued)

FOREIGN PATENT DOCUMENTS

CN 1468743 1/2004
CN 104210321 12/2014
(Continued)

OTHER PUBLICATIONS

"International Search Report (Form PCT/ISA/210) of PCT/JP2020/020630," dated Aug. 11, 2021, with English translation thereof, pp. 1-5.
(Continued)

Primary Examiner — Toan C To
(74) Attorney, Agent, or Firm — JCIPRNET

(57) ABSTRACT

The suspension device according to the present invention is provided with a leaf spring extending in a belt shape, a first arm, a second arm, and a coupling member for rotatably coupling the first arm and the second arm, wherein: a first holding part for holding one end of the leaf spring and a second holding part for holding the other end of the leaf spring are provided; and the first and second arms each support the leaf spring by at least one portion that is different from the one end or the other end of the leaf spring.

6 Claims, 4 Drawing Sheets

(52) U.S. Cl.
CPC .............. *B60G 2206/428* (2013.01); *B60G 2206/7101* (2013.01); *F16F 1/3683* (2013.01)

(56) References Cited

U.S. PATENT DOCUMENTS

| | | | | |
|---|---|---|---|---|
| 2,200,798 A * | 5/1940 | Megow | ................ | B60G 11/08 267/230 |
| 2,250,247 A * | 7/1941 | Ballamy | ................ | B60G 11/08 280/124.171 |
| 3,170,682 A * | 2/1965 | Eggers | ................ | B60G 11/08 280/124.135 |
| 3,913,941 A * | 10/1975 | Guerriero | ................ | B60G 15/06 280/124.171 |
| 4,458,918 A * | 7/1984 | Rumpel | ................ | B60G 3/28 280/124.171 |
| 4,619,466 A | 10/1986 | Schaible et al. | | |
| 4,813,704 A * | 3/1989 | Smith | ................ | B60G 15/06 280/124.171 |
| 4,858,950 A * | 8/1989 | Kajiwara | ................ | B60G 11/08 280/6.15 |
| 5,016,861 A * | 5/1991 | Thompson | ................ | F16F 1/18 267/52 |
| 5,826,896 A * | 10/1998 | Baumann | ................ | B60G 11/10 280/124.171 |
| 6,189,904 B1 | 2/2001 | Gentry et al. | | |
| 6,530,587 B2 * | 3/2003 | Lawson | ................ | F16F 1/3686 280/124.171 |
| 6,616,159 B2 * | 9/2003 | Lawson | ................ | B29C 70/222 280/124.135 |
| 8,485,543 B2 * | 7/2013 | Richardson | ................ | B62D 7/08 280/124.167 |
| 9,073,400 B2 * | 7/2015 | Perri | ................ | B60G 7/008 |
| 11,267,303 B2 * | 3/2022 | Senoo | ................ | B60G 3/20 |
| 2013/0241167 A1 | 9/2013 | Perri et al. | | |
| 2019/0113095 A1 * | 4/2019 | Wolf-Monheim | ...... | B32B 5/028 |
| 2019/0309815 A1 * | 10/2019 | Pleyer | ................ | F16F 1/20 |

FOREIGN PATENT DOCUMENTS

| | | | | |
|---|---|---|---|---|
| CN | 109843613 | | 6/2019 | |
| DE | 1924175 | | 11/1969 | |
| DE | 2451671 | | 5/1976 | |
| JP | H07257131 | | 10/1995 | |
| JP | H0999721 | | 4/1997 | |
| JP | H10329520 | | 12/1998 | |
| JP | H11263109 | | 9/1999 | |
| WO | WO-2019111924 A1 * | | 6/2019 | ............ B60G 11/08 |

OTHER PUBLICATIONS

"Search Report of Europe Counterpart Application", dated Jun. 29, 2022, p. 1-p. 8.
"Office Action of China Counterpart Application", dated Mar. 30, 2023, with English translation thereof, p. 1-p. 14.
"Office Action of China Counterpart Application", dated Jul. 25, 2023, with English translation thereof, p. 1-p. 10.

* cited by examiner

SUSPENSION DEVICE

CROSS-REFERENCE TO RELATED APPLICATION

This application is a 371 application of the International PCT application serial no. PCT/JP2020/020630, filed on May 25, 2020, which claims the priority benefits of Japan Patent Application No. 2019-117818, filed on Jun. 25, 2019. The entirety of each of the above-mentioned patent applications is hereby incorporated by reference herein and made a part of this specification.

BACKGROUND

Technical Field

The invention relates to a suspension device.

Description of Related Art

Conventionally, suspension devices are known to be provided in a vehicle or the like, and have a cushioning function for preventing the vibration caused by unevenness of a road surface from being transmitted to a vehicle body through the wheels and improve the riding comfort and steering stability of the vehicle. A leaf spring type suspension device, among the suspension devices, is configured by using a leaf spring (see, for example, Patent Document 1).

The leaf spring is attached to an arm that supports the wheels and a member that supports the vehicle body. Specifically, the leaf spring is attached to a right arm that supports the right wheel, a left arm that supports the left wheel, and a member that supports the vehicle body.

Related Art

Patent Document

[Patent Document 1] Japanese Laid-Open No. 11-263109

SUMMARY

Problems to be Solved

However, in the conventional suspension device, the leaf spring is attached to the member, and therefore the vibration from the wheels is transmitted to the vehicle body through the member with the leaf spring as a transmission path. If the vibration is transmitted to the vehicle body, the quality of riding comfort and the steering stability may deteriorate.

In view of the above, the invention provides a suspension device that can suppress the vibration from the wheels from being transmitted to the vehicle body.

Means for Solving the Problems

Accordingly, the suspension device according to the invention includes: a leaf spring that extends in a belt shape; a first arm; a second arm; and a coupling member that rotatably couples the first arm and the second arm. The suspension device is characterized in having: a first holding part that holds one end of the leaf spring; and a second holding part that holds an other end of the leaf spring, and the first arm and the second arm support the leaf spring by at least one portion that is different from the one end and the other end of the leaf spring.

Further, the suspension device according to the invention is characterized in that, in the above-mentioned invention, a support position of the leaf spring supported by the first arm and the second arm is located between a first coupling position between the first arm and the coupling member and a second coupling position between the second arm and the coupling member.

Further, the suspension device according to the invention is characterized in that, in the above-mentioned invention, the first holding part is provided on the first arm, and the second holding part is provided on the second arm.

Further, the suspension device according to the invention is characterized in that, in the above-mentioned invention, the leaf spring is made of fiber reinforced plastics.

Effects

According to the invention, the effect of suppressing the vibration from the wheels from being transmitted to the vehicle body is achieved.

DESCRIPTION OF THE EMBODIMENTS

Hereinafter, embodiments for carrying out the invention will be described in detail together with drawings. Nevertheless, the invention is not limited to the following embodiments. In addition, each of the drawings referred to in the following description merely schematically shows the shape, size, and positional relationship to an extent that allows the content of the invention to be understood. That is to say, the invention is not limited to the shape, size, and positional relationship exemplified in each drawing.

First Embodiment

Figure 1:
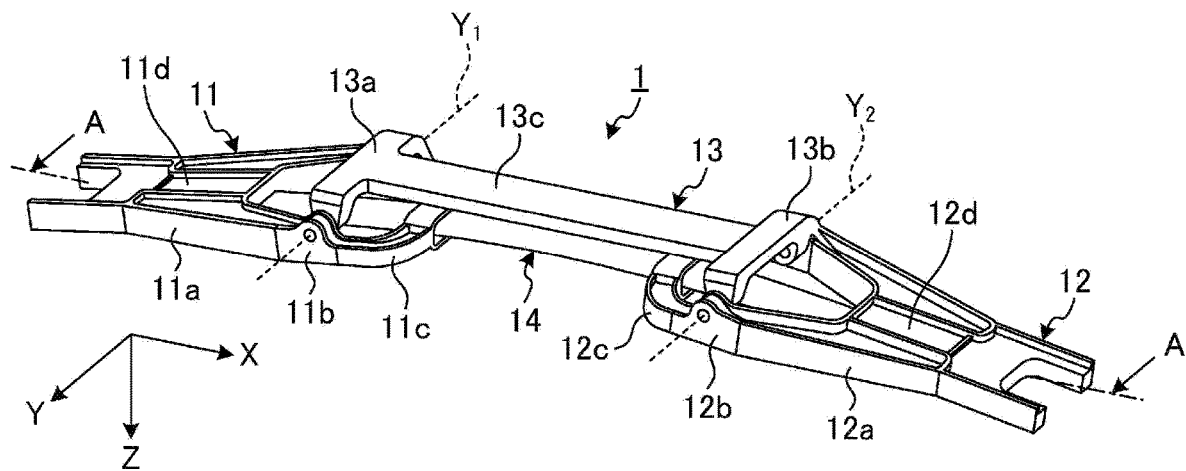
FIG. 1 is a perspective view schematically showing a configuration of a suspension device according to an embodiment of the invention.
Figure 2:
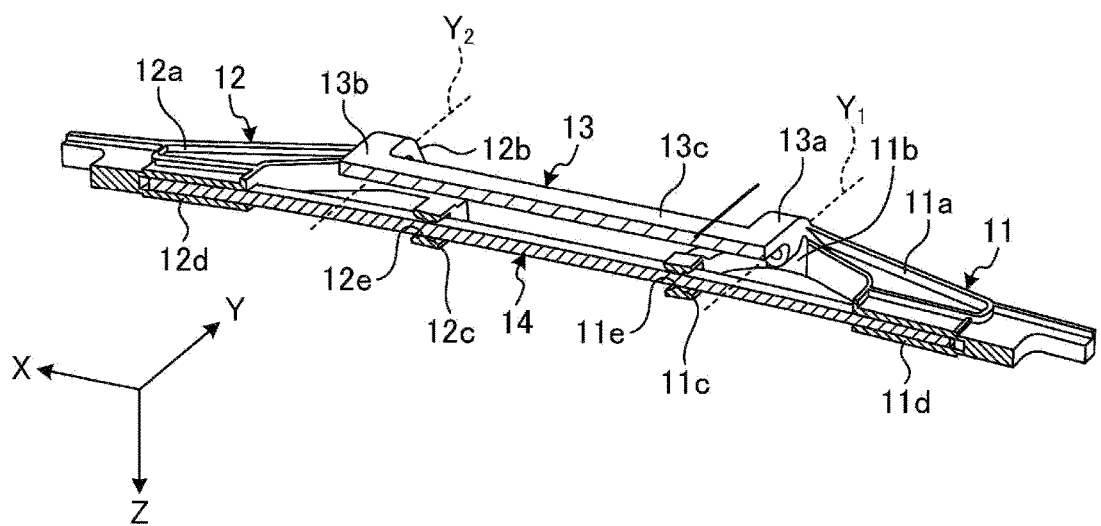
FIG. 2 is a cross-sectional view taken along the line A-A shown in FIG. 1.

FIG. 1 is a perspective view schematically showing a configuration of a suspension device according to an embodiment of the invention. FIG. 2 is a cross-sectional view taken along the line A-A shown in FIG. 1. The suspension device 1 is provided in, for example, a vehicle and is interposed between a right wheel, a left wheel, and a vehicle body (body) to suppress the vibration transmitted from the wheels from being transmitted to the vehicle body.

The suspension device 1 includes a right arm 11 that supports the right wheel, a left arm 12 that supports the left wheel, a member 13 that supports the vehicle body, and a leaf spring 14 that elastically deforms in response to the vibration from the wheels. The suspension device 1 is attached to the vehicle body via the member 13 and absorbs the vibration transmitted from the wheels according to the unevenness of a road surface. The wheels are supported by the arms via a knuckle, a disc rotor, etc. In FIG. 1, an X direction corresponds to a left-right direction of the vehicle when attached to the vehicle body, a Y direction corresponds to a front-rear direction of the vehicle, and a Z direction corresponds to an up-down direction of the vehicle.

The right arm 11 has a support part 11a that supports the right wheel, a supported part 11b that is provided on a side opposite to a wheel support side of the support part 11a and is supported by the member 13, a grip part 11c that extends to a side of the supported part 11b opposite to the side of the support part 11a and grips a part of the leaf spring 14, and a holding part 11d that holds one end of the leaf spring 14. The holding part 11d corresponds to the first holding part.

The left arm 12 has a support part 12a that supports the left wheel, a supported part 12b that is provided on a side opposite to a wheel support side of the support part 12a and is supported by the member 13, a grip part 12c that extends to a side of the supported part 12b opposite to the side of the support part 12a and grips a part of the leaf spring 14, and a holding part 12d that holds the other end of the leaf spring 14. The holding part 12d corresponds to the second holding part.

The member 13 supports the vehicle body and is interposed between the vehicle body and the right wheel, the right arm 11, the left wheel, and the left arm 12. The member 13 has an arm support part 13a that supports the right arm 11, an arm support part 13b that supports the left arm 12, and a main body part 13c that extends in the X direction (the left-right direction of the vehicle body) and connects to the right arm 11 and the left arm 12. The arm support parts 13a and 13b extend in a direction (Y direction) perpendicular to the direction (X direction) in which the main body part 13c extends. The arm support part 13a rotatably supports the right arm 11 around a rotation axis $Y_1$ extending in the Y direction. The arm support part 13b rotatably supports the left arm 12 around a rotation axis $Y_2$ extending in the Y direction. The member 13 corresponds to the coupling member that rotatably couples the right arm 11 and the left arm 12. The member 13 may be integrated with the vehicle body. When the member 13 is integrated with the vehicle body, the vehicle body functions as the coupling member for coupling the right arm 11 and the left arm 12.

The leaf spring 14 forms a belt shape and extends in the X direction. The leaf spring 14 is formed by using, for example, fiber reinforced plastics (FRP), metal, or resin. The leaf spring may be made of one plate material or may be made by laminating a plurality of plate materials. In designing the shape, elastic force, etc. of the leaf spring 14, FRP is more flexible in its design than metal or resin.

Here, the holding parts 11d and 12d respectively accommodate and hold the end portions of the leaf spring 14. In this specification, accommodating a part of a member, surrounding a member surface, and restraining and holding a movement of the member in a vertical direction (here, the Z direction), a movement in a horizontal direction (here, the Y direction), and a rotational movement are referred to as surface support. The holding parts 11d and 12d hold the end portions of the leaf spring 14 by surface support. The leaf spring 14 can move in a direction of being inserted into or removed from the holding parts 11d and 12d.

Further, the grip part 11c is formed with protrusions 11e respectively on two grip surfaces that are surfaces for gripping the leaf spring 14 and face each other. The grip part 11c sandwiches and supports the leaf spring 14 with the protrusions 11e. In this specification, supporting a part of a member at a point or line with protrusions or the like is referred to as point support. In the point support, the leaf spring 14 is supported by an area so as to rotate with the protrusions 12e as a fulcrum. The grip part 11c supports the leaf spring 14 by point support. On the other hand, in the surface support described above, the leaf spring 14 is in a state where it cannot be rotated by the holding parts 11d and 12d even when a load is applied from the arms.

Further, the grip part 12c is formed with protrusions 12e respectively on two grip surfaces that are surfaces for gripping the leaf spring 14 and face each other. The grip part 12c point-supports the leaf spring 14 with the protrusions 12e.

A support position of the leaf spring 14 supported by the grip part 11c (protrusions 11e) is on an inner side (the side opposite to the right wheel side) with respect to a coupling position (rotation axis $Y_1$) between the right arm 11 and the member 13. Furthermore, a support position of the leaf spring 14 supported by the grip part 12c (protrusions 12e) is on an inner side (the side opposite to the left wheel side) with respect to a coupling position (rotation axis $Y_2$) between the left arm 12 and the member 13. The support position of the leaf spring 14 supported by the grip part 11c and the support position of the leaf spring 14 supported by the grip part 12c are both located between the rotation axis $Y_1$ and the rotation axis $Y_2$.

Figure 3:
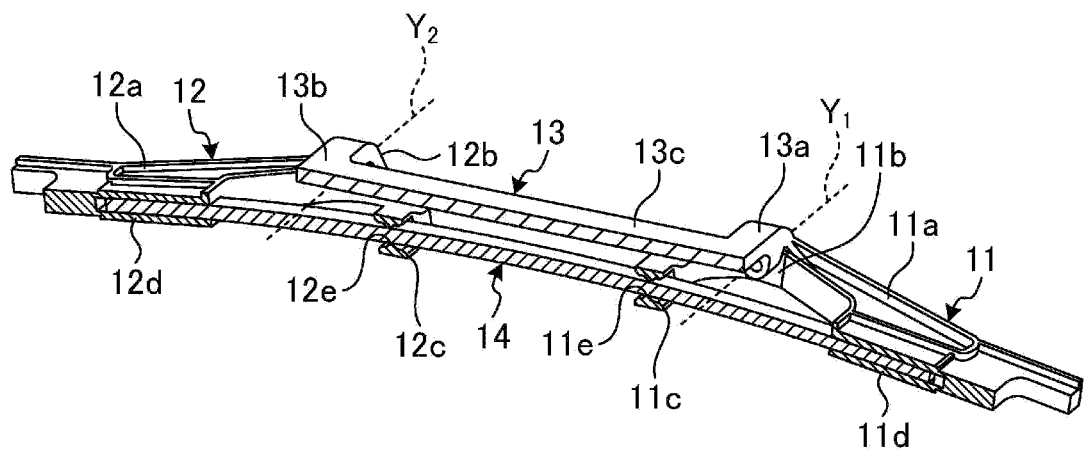
FIG. 3 is a view showing an example of a curved mode of the leaf spring of the suspension device according to an embodiment of the invention.
Figure 4:
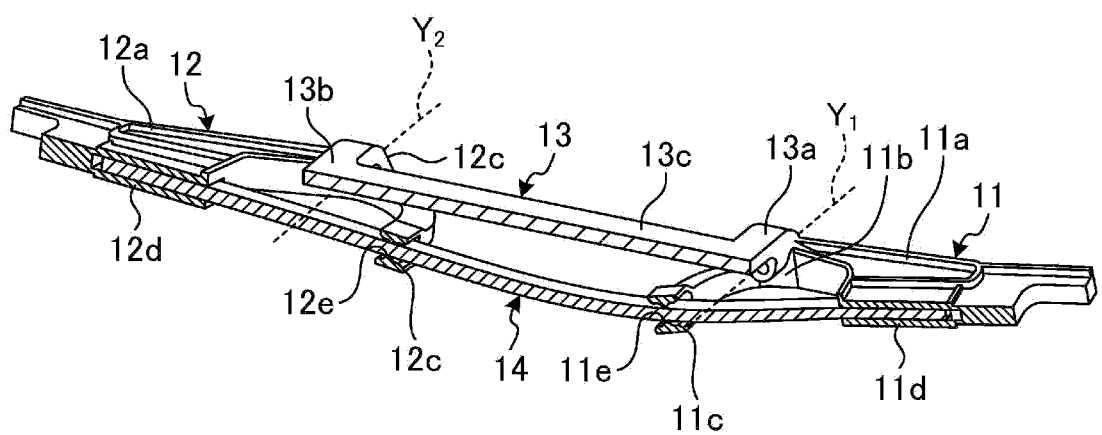
FIG. 4 is a view showing an example of the curved mode of the leaf spring of the suspension device according to an embodiment of the invention.

FIG. 3 and FIG. 4 are views showing an example of a curved mode of the leaf spring of the suspension device according to an embodiment of the invention. FIG. 3 is a view showing a state where the leaf spring 14 is deformed due to the displacement of the arms. Further, FIG. 4 is a view showing a state of curving in a mode opposite to that of FIG. 3. As shown in FIG. 3 and FIG. 4, even when the leaf spring 14 is deformed due to the displacement of the arms, the member 13 is not affected by the deformation. In the suspension device 1, even if the leaf spring 14 is deformed, the member 13 is not deformed. That is, in the suspension device 1, when vibration is transmitted from the arms to the leaf spring 14, the leaf spring 14 absorbs the vibration and the vibration is not transmitted to the member 13. At this time, since the right arm 11 and the left arm 12 are rotatably supported by the member 13, and a load due to the fluctuation is converted into a rotational force, the vibration of the arms is suppressed from being transmitted to the member 13.

In the embodiment described above, the leaf spring 14 is supported by the right arm 11 and the left arm 12, and the leaf spring 14 absorbs the vibration transmitted by the displacement of the arms, and the vibration due to the deformation (displacement) of the leaf spring 14 is not directly transmitted to the member 13. Therefore, the vibration from the wheels can be suppressed from being transmitted to the vehicle body. Furthermore, in the suspension device 1, for example, when the vehicle body is tilted (rolled) and one wheel is displaced to the upper side (vehicle body side) and the other wheel is displaced to the opposite side (here, the opposite side in the Z direction), the leaf spring 14 is deformed or returns to its original shape, thereby suppressing the inclination (roll angle) of the vehicle body.

In addition, in the embodiment, since the leaf spring 14 is arranged in an arrangement area of the arms, an arrangement space for the leaf spring 14 can be efficient.

First Modification of the Embodiment

Figure 5:
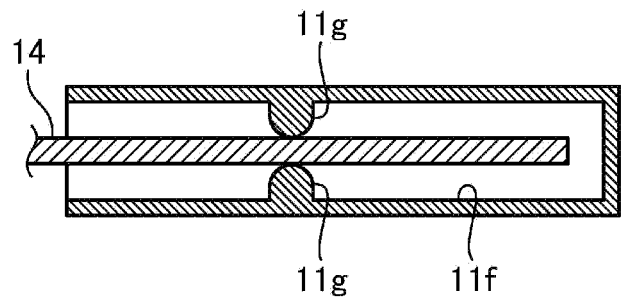
FIG. 5 is a perspective view schematically showing a configuration of main parts of the suspension device according to the first modification of the embodiment of the invention.

FIG. 5 is a perspective view schematically showing a configuration of main parts of the suspension device according to the first modification of the embodiment of the invention. The above-described embodiment illustrates an example in which the holding part 11d holds the leaf spring 14 by surface support, but in the first modification, the holding part holds the leaf spring 14 by point support. In the first modification, the configuration is the same as that of the above-described embodiment except for the configuration of the holding part of the right arm. Hereinafter, the configuration of the holding part 11f of the right arm will be described.

The holding part 11f holds one end of the leaf spring 14. The holding part 11f accommodates and holds the end portion of the leaf spring 14. The holding part 11f is formed with protrusions 11g respectively on two surfaces that are surfaces for accommodating the leaf spring 14 and face each other. The holding part 11f supports the leaf spring 14 by point support.

Even when the holding part 11f of the right arm point-supports the leaf spring 14 as in the first modification described above, the vibration is not transmitted to the member 13 due to the deformation (displacement) of the leaf spring 14, and therefore the vibration from the wheels can be suppressed from being transmitted to the vehicle body.

The holding part provided on the left arm may also be configured to point-support the leaf spring 14. Further, the leaf spring 14 may be configured to be surface-supported in the grip parts 11c and 12c. In regard to the point support and the surface support, a spring constant of the leaf spring 14 changes even if the support position is the same. A support mode may be changed to adjust the spring constant of the leaf spring 14. Further, in addition to the surface support and the point support, a hinge support configuration that allows rotation along the movement of the leaf spring 14 may be used.

Second Modification of the Embodiment

Figure 6:
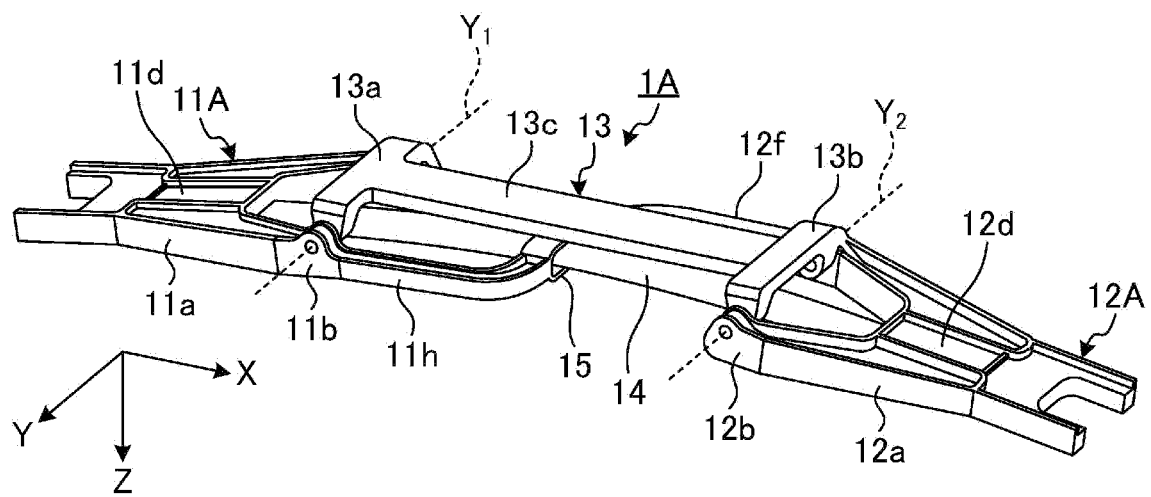
FIG. 6 is a perspective view schematically showing a configuration of the suspension device according to the second modification of the embodiment of the invention.

FIG. 6 is a perspective view schematically showing a configuration of the suspension device according to the second modification of the embodiment of the invention. The suspension device 1A according to the second modification includes a right arm 11A that supports the right wheel, a left arm 12A that supports the left wheel, a member 13 that supports the vehicle body, a leaf spring 14 that elastically deforms in response to the vibration from the wheels, and a grip part 15 that grips the leaf spring 14. Since the member 13 and the leaf spring 14 have the same configuration as that of the embodiment, the description thereof is omitted.

The right arm 11A has a support part 11a that supports the right wheel, a supported part 11b that is provided on a side opposite to a wheel support side of the support part 11a and is supported by the member 13, a holding part 11d (see FIG. 2) that holds one end of the leaf spring 14, and a coupling part 11h that extends to a side of the supported part 11b opposite to the side of the support part 11a and is connected to the grip part 15.

The left arm 12A has a support part 12a that supports the left wheel, a supported part 12b that is provided on a side opposite to a wheel support side of the support part 12a and is supported by the member 13, a holding part 12d (see FIG. 2) that holds the other end of the leaf spring 14, and a coupling part 12f that extends to a side of the supported part 12b opposite to the side of the support part 12a and is connected to the grip part 15.

The grip part 15 forms an annular shape and grips a central portion of the leaf spring 14 in a longitudinal direction. A support position of the leaf spring 14 supported by the grip part 15 is located between a coupling position (rotation axis $Y_1$) between the right arm 11A and the member 13 and a coupling position (rotation axis $Y_2$) between the left arm 12A and the member 13.

The coupling parts 11h and 12f are connected to the grip part 15 at different positions. The right arm 11A grips the leaf spring 14 by the grip part 15 via the coupling part 11h. The left arm 12A grips the leaf spring 14 by the grip part 15 via the coupling part 12f. The right arm 11A and the left arm 12A support the leaf spring by the common grip part 15. In the second modification, a bearing or the like may be provided between the grip part 15 and at least one of the right arm 11A and the left arm 12A for the right arm 11A and the left arm 12A to rotate independently of the grip part 15.

In the suspension device 1A, when vibration is transmitted from the arms to the leaf spring 14, the leaf spring 14 also absorbs the vibration and the vibration is not transmitted to the member 13.

In the second modification described above, the leaf spring 14 is supported by the right arm 11A and the left arm 12A, and the leaf spring 14 absorbs the vibration transmitted by the displacement of the arms, and the vibration due to the deformation (displacement) of the leaf spring 14 is not transmitted to the member 13. Therefore, the vibration from the wheels can be suppressed from being transmitted to the vehicle body.

Third Modification of the Embodiment

Figure 7:
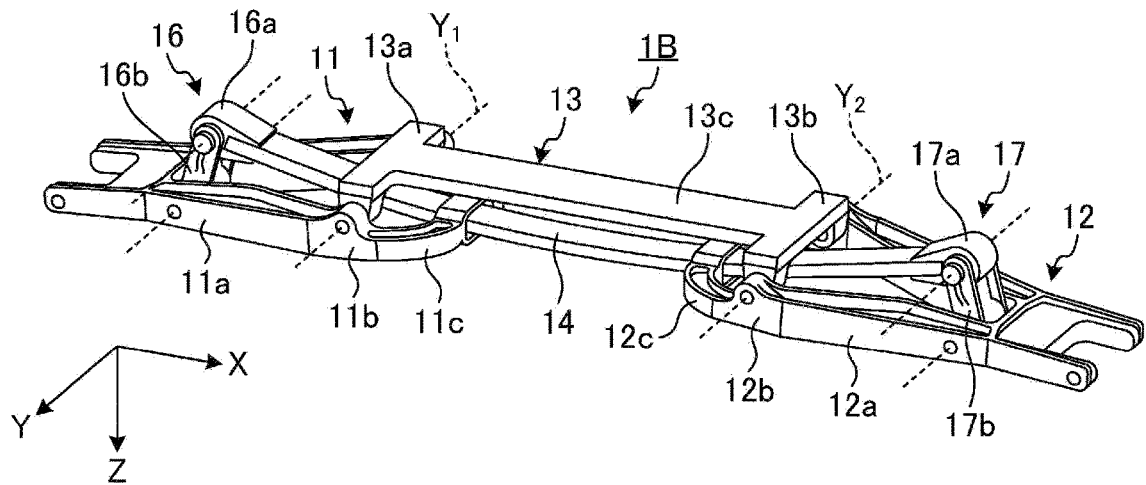
FIG. 7 is a perspective view schematically showing a configuration of the suspension device according to the third modification of the embodiment of the invention.

FIG. 7 is a perspective view schematically showing a configuration of the suspension device according to the third modification of the embodiment of the invention. The above-described embodiment and first and second modifications illustrate examples in which the arms hold the leaf spring, but in the third modification, links (first link 16 and second link 17) connected to the arms 11 and 12 hold the leaf spring. The suspension device 1B according to the third modification includes a right arm 11 that supports the right wheel, a left arm 12 that supports the left wheel, a member 13 that supports the vehicle body, a leaf spring 14 that elastically deforms in response to the vibration from the wheels, a first link 16 that grips one end of the leaf spring 14 and is connected to the right arm 11, and a second link 17 that grips the other end of the leaf spring 14 and is connected to the left arm 12. In the third modification, the configuration is the same as that of the above-described embodiment except for the configuration of the links and that the right arm 11 and the left arm 12 do not have the holding parts 11d and 12d. Hereinafter, the configuration of the first link 16 and the second link 17 will be described.

The first link 16 has a holding part 16a that holds one end of the leaf spring 14, and a connecting part 16b that connects to the right arm 11. The holding part 16a is rotatably supported by the connecting part 16b around an axis parallel to the Y direction. The holding part 16a is supported by the connecting part 16b by, for example, a pin or a ball joint. The connecting part 16b is rotatably supported by the right arm 11 around an axis parallel to the Y direction. The connecting part 16b is supported by the right arm 11 by, for example, a pin or a ball joint. The holding part 16a corresponds to the first holding part.

The second link 17 has a holding part 17a that holds the other end of the leaf spring 14, and a connecting part 17b that connects to the left arm 12. The holding part 17a is rotatably supported by the connecting part 17b around an axis parallel to the Y direction. The holding part 17a is supported by the connecting part 17b by, for example, a pin or a ball joint. The connecting part 17b is rotatably supported by the left arm 12 around an axis parallel to the Y direction. The connecting part 17b is supported by the left arm 12 by, for example, a pin or a ball joint. The holding part 17a corresponds to the second holding part. In FIG. 7, the first link 16 and the second link 17 respectively support the leaf spring 14 by surface support, but may support the leaf spring 14 by point support.

Even when the link connected to each arm holds the leaf spring 14 as in the third modification described above, the vibration is not transmitted to the member 13 due to the deformation (displacement) of the leaf spring 14, and therefore the vibration from the wheels can be suppressed from being transmitted to the vehicle body.

Fourth Modification of the Embodiment

Figure 8:
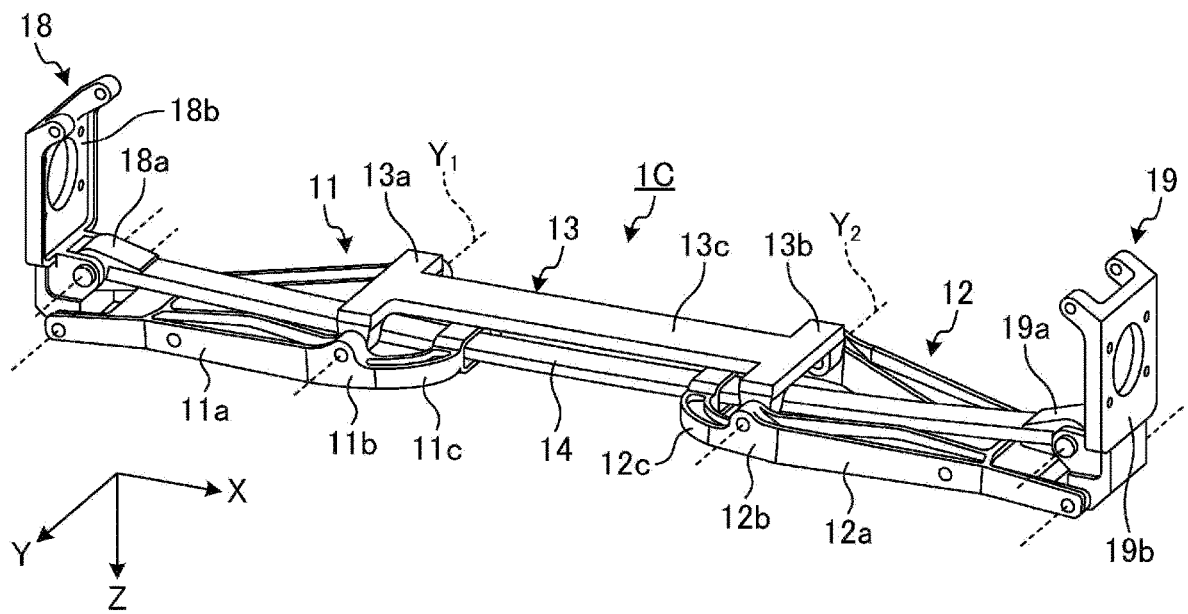
FIG. 8 is a perspective view schematically showing a configuration of the suspension device according to the fourth modification of the embodiment of the invention.

FIG. 8 is a perspective view schematically showing a configuration of the suspension device according to the fourth modification of the embodiment of the invention. In the fourth modification, a knuckle that is interposed between the wheel and the arm and supports a bearing holds the leaf spring. The suspension device 1C according to the fourth modification includes a right arm 11 that supports the right wheel, a left arm 12 that supports the left wheel, a member 13 that supports the vehicle body, a leaf spring 14 that elastically deforms in response to the vibration from the wheels, a first knuckle 18 that grips one end of the leaf spring 14 and is connected to the right arm 11, and a second knuckle 19 that grips the other end of the leaf spring 14 and is connected to the left arm 12. In the fourth modification, the configuration is the same as that of the above-described embodiment except for the configuration of the knuckle and that the right arm 11 and the left arm 12 do not have the holding parts 11d and 12d. Hereinafter, the configuration of the first knuckle 18 and the second knuckle 19 will be described.

The first knuckle 18 has a holding part 18a that holds one end of the leaf spring 14, and a connecting part 18b that supports the bearing and connects to the right arm 11. The holding part 18a is rotatably supported by the connecting part 18b around an axis parallel to the Y direction. The holding part 18a is supported by the connecting part 18b by, for example, a pin or a ball joint. The connecting part 18b is rotatably supported by the right arm 11 around an axis parallel to the Y direction. The connecting part 18b is supported by the right arm 11 by, for example, a pin or a ball joint. The holding part 18a corresponds to the first holding part.

The second knuckle 19 has a holding part 19a that holds the other end of the leaf spring 14, and a connecting part 19b that supports the bearing and connects to the left arm 12. The holding part 19a is rotatably supported by the connecting part 19b around an axis parallel to the Y direction. The holding part 19a is supported by the connecting part 19b by, for example, a pin or a ball joint. The connecting part 19b is rotatably supported by the left arm 12 around an axis parallel to the Y direction. The connecting part 19b is supported by the left arm 12 by, for example, a pin or a ball joint. The holding part 19a corresponds to the second holding part. In FIG. 8, the first knuckle 18 and the second knuckle 19 respectively support the leaf spring 14 by surface support, but may support the leaf spring 14 by point support.

Even when the knuckle connected to each arm holds the leaf spring 14 as in the fourth modification described above, the vibration is not transmitted to the member 13 due to the deformation (displacement) of the leaf spring 14, and therefore the vibration from the wheels can be suppressed from being transmitted to the vehicle body.

As in the third and fourth modifications, a member which is separate from the arms and is provided between the vehicle body and the wheels and related to the connection between them may be configured to hold the leaf spring. Further, in the third and fourth modifications, the support position of the leaf spring 14 supported by the right arm and the left arm may be set to the position of the second modification.

Although the embodiments for carrying out the invention have been described above, the invention should not be construed as being limited to the above-described embodiments only. Thus, the invention may include various embodiments not described here, and it is possible to make various changes in design within the scope that does not deviate from the technical idea defined by the claims.

In the above-described embodiments and modifications, a cushioning member such as rubber may be provided in a portion of the arm that comes into contact with the leaf spring, and the leaf spring may be supported via the cushioning member.

Further, the above-described embodiments and modifications illustrate examples in which the leaf spring is gripped between the coupling position between the right arm and the member and the coupling position between the left arm and the member. However, the leaf spring may be supported at a position overlapping the coupling position when viewed from the Z direction, or the leaf spring may be supported on the wheel side (outer side) with respect to the coupling position.

Besides, in the above-described embodiments and modifications, a gripping position of the leaf spring 14 gripped by the grip part may be movable by an actuator or the like.

In addition, in the above-described embodiments and modifications, the leaf spring may be supported by a plurality of portions such as 5 or more.

Further, the suspension devices according to the above-described embodiments and modifications may be provided in a vehicle in combination with another suspension device such as a suspension device using a coil spring.

Industrial Applicability

As described above, the suspension device according to the invention is suitable for suppressing the vibration from the wheels from being transmitted to the vehicle body.

What is claimed is:
1. A suspension device, comprising:
a leaf spring that extends in a belt shape;
a first arm;
a second arm; and
a coupling member that rotatably couples the first arm and the second arm,
wherein the suspension device has:
a first holding part that holds one end of the leaf spring; and a second holding part that holds an other end of the leaf spring, wherein the first arm and the second arm support the leaf spring by at least one portion that is different from the one end and the other end of the leaf spring, a support position of the leaf spring supported by the first arm and the second arm is located between a first coupling position between the first arm and the coupling member and a second coupling position between the second arm and the coupling member, the support position of the leaf spring supported by the first arm and the second arm is located below the coupling member and spaced apart from the coupling member.

2. The suspension device according to claim 1, wherein the first holding part is provided on the first arm, and the second holding part is provided on the second arm.

3. The suspension device according to claim 1, wherein the leaf spring is made of fiber reinforced plastics.

4. The suspension device according to claim 1, wherein the first holding part is provided on the first arm, and the second holding part is provided on the second arm.

5. The suspension device according to claim 1, wherein the leaf spring is made of fiber reinforced plastics.

6. The suspension device according to claim 2, wherein the leaf spring is made of fiber reinforced plastics.

\* \* \* \* \*